United States Patent [19]
Fukaya

[11] 3,979,605
[45] Sept. 7, 1976

[54] INTEGRATING CIRCUIT FOR SEPARATING A WIDE PULSE FROM A NARROW PULSE

[75] Inventor: Hirokazu Fukaya, Tokyo, Japan

[73] Assignee: Nippon Electric Company, Ltd., Tokyo, Japan

[22] Filed: Mar. 14, 1975

[21] Appl. No.: 558,602

[30] Foreign Application Priority Data
Mar. 14, 1974  Japan.............................. 49-29416

[52] U.S. Cl.............................. 307/229; 307/234; 178/7.3 S
[51] Int. Cl.² ...................... G06G 7/12; H03K 5/20
[58] Field of Search ............ 328/139, 127; 307/228, 307/229, 234; 178/7.3 S, 7.5 S

[56] References Cited
UNITED STATES PATENTS

| | | | |
|---|---|---|---|
| 3,219,838 | 11/1965 | Hurst | 307/234 |
| 3,527,888 | 9/1970 | Clapp et al. | 307/234 |
| 3,567,966 | 3/1971 | Gilbert et al. | 307/234 |
| 3,801,828 | 4/1974 | Lynn et al. | 328/127 |

Primary Examiner—Stanley D. Miller, Jr.
Attorney, Agent, or Firm—Sughrue, Rothwell, Mion, Zinn and Macpeak

[57] ABSTRACT

This invention relates to an integrating circuit especially suitable for use as a vertical synchronizing signal separation circuit in a television receiver set, which comprises a transistor, a parallel circuit of a resistor and a capacitor connected between the emitter of the transistor and the ground, a capacitor connected between the base and the emitter of the transistor, and a resistor connected between the base of the transistor and an input terminal. A composite synchronizing signal applied to the input terminal is fed to the base, and a vertical synchronizing signal can be derived either from the emitter or from the collector of the transistor. Owing to a positive feedback effect, the vertical synchronizing signal can be obtained as a sufficiently large signal even if the applied composite synchronizing signal is weak.

4 Claims, 6 Drawing Figures

INTEGRATING CIRCUIT FOR SEPARATING A WIDE PULSE FROM A NARROW PULSE

FIELD OF THE INVENTION

The present invention relates to an integrating circuit, and more particularly, to an integrating circuit employing an active element which is most suitable for use as a vertical synchronizing signal separation circuit in a television receiver set.

BACKGROUND OF THE INVENTION:

As is well known, the prior art integrating circuit comprises a resistor connected between an input terminal and an output terminal, and a capacitor connected between the output terminal and a grounded terminal, or a plurality of such circuits connected in cascade. Such a circuit provides only a small output in response to a weak input because it consists of passive circuit elements only. While such a circuit has been widely employed especially in a vertical synchronizing signal separation circuit of a television receiver set, it has the disadvantage that a synchronizing pulse that has a sufficiently large magnitude for vertical synchronization cannot be obtained from a composite synchronizing signal if the received electromagnetic wave is of low intensity. In addition, for the purpose of enlarging the time constant of the integrating circuit to sufficiently attenuate a horizontal synchronizing signal at the output, the impedances of the respective elements are large, or two or three stages of such integrating circuits are cascaded. In this case, in addition to an undesired increase of the attenuation of the vertical synchronizing signal at the output the input and output impedances are high, resulting in impedance mismatching with other circuits to be connected to the integrating circuit.

As an approach for overcoming the above-described disadvantages, it has been proposed to connect a pulse amplifier just behind the integrating circuit, and thereby the magnitude of the vertical synchronizing signal obtained at the output in response to a weak input signal will be improved to a certain extent. However, the separation from the horizontal synchronizing pulse has not been improved because the integration is achieved by the integrating circuit that cannot achieve an active operation.

SUMMARY OF THE INVENTION

It is a principal object of the present invention to provide an integrating circuit which selectively attenuates undesired signal components contained in an input signal and which derives a sufficiently large output from a desired signal component, even where the input signal is weak.

Another object of the present invention is to provide an integrating circuit with only a little loss caused by impedance mismatching with other connected circuits.

According to the present invention, there is provided an integrating circuit comprising a transistor having its emitter grounded via a resistor and its base connected to a resistor which is in turn connected to a signal input terminal, a first capacitor connected between the base and the emitter of the transistor, and a second capacitor connected in parallel to the emitter-grounding resister of the transistor. An output is derived either from the emitter or from the collector of the transistor.

An input signal is applied at the input terminal to charge the first capacitor between the emitter and the base of the transistor to cause it to conduct with the charged voltage, thereby charging the second capacitor connected in parallel to the emitter resistor. Owing to the fact that the raised emitter potential is positively fed back to the base, the emitter potential is further increased. On the other hand, in response to a pulse signal having a small pulse width and a large pulse interval such as a pulse signal appearing during a horizontal synchronizing pulse period of a composite synchronizing signal for a television receiver set, the transistor would not become conductive because the base-emitter voltage does not rise higher than a threshould base-emitter voltage of the transistor, and therefore, an output signal is hardly obtained. As described above, according to the present invention, in response to a desired input signal, such as a vertical synchronizing pulse, an enhanced integration output can be obtained, while in response to an undesired input signal, such as a horizontal synchronizing pulse, a suppressed output is obtained. In addition, since the output impedance of the integrating circuit is low and the input impedance thereof is high, there is only a little loss produced when it is connected to other circuits.

Figure 1:
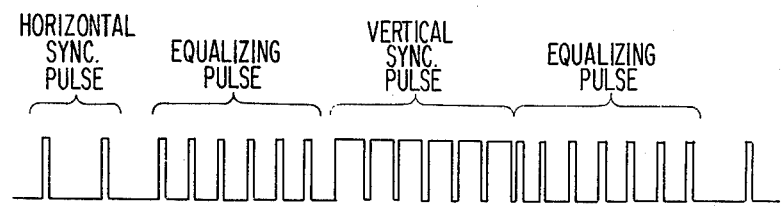
FIG. 1 is a waveform diagram showing a typical composite synchronizing signal useful in a television system.

DETAILED DESCRIPTION OF PREFERRED EMBODIMENTS:

Generally a composite synchronizing signal useful in a television system has a waveform as illustrated in FIG. 1. The horizontal and vertical synchronizing signals for a receiver set are derived, respectively, by employing a differentiating circuit for the horizontal synchronizing signal pulse and by employing an integrating circuit for the vertical synchronizing signal pulse.

Figure 2A:
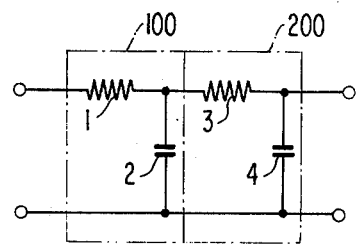
FIGS. 2(a) and 2(b) are schematic circuit diagrams of the integrating circuits in the prior art.

In order to derive a vertical synchronizing signal, a television receiver set includes an integrating circuit as shown in FIG. 2(a) and in some cases, it contains a circuit as shown in FIG. 2 (b). The arrangement shown in FIG. 2(a), comprises an integrating circuit 100 consisting of a resistor 1 and a capacitor 2 and another integrating circuit 200 consisting of a resistor 3 and a capacitor 4, both circuits being cascaded. In such an integrating circuit, the separation between the horizontal synchronizing pulse and the vertical synchronizing pulse is improved as compared to the case where the integrating circuit 100 or 200 alone is employed however, the magnitude of the output signal is considerably attenuated causing a serious problem if the magnitude of the input signal is small. Therefore, the degree of the separation between the horizontal synchronizing pulse and the vertical synchronizing pulse and the magnitude of the output signal are opposing requirements, and one is forced to design the circuit so as to compromise between these requirements. Accordingly, neither one of these opposing requirements can be fully satisfied. In addition, because of the aforementioned limitations, the input and output impedances are also restricted, making it impossible to obtain a high input impedance and a low due to output impedance. Furthermore, output signals caused by equalizing pulses there is likely to be a shaking called "jitter" in the picture image.

Figure 2B:
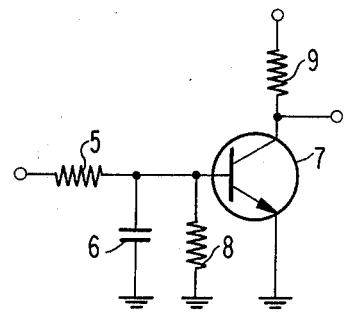

With reference to FIG. 2(b), there is shown an integrating circuit consisting of a resistor 5 and a capacitor 6 which is connected to a pulse amplifier consisting of a transistor 7 and resistors 8 and 9, which amplifier in response to a weak input signal produces an output having a fairly improved magnitude. However, since the output of the integrating circuit is in itself amplified, no improvement is made in respect to the separation between the horizontal and vertical synchronizing pulses. In addition, as the output signal is an inverted signal, a special provision is required in applying the output signal to an input of a synchronizing circuit.

Figure 3:
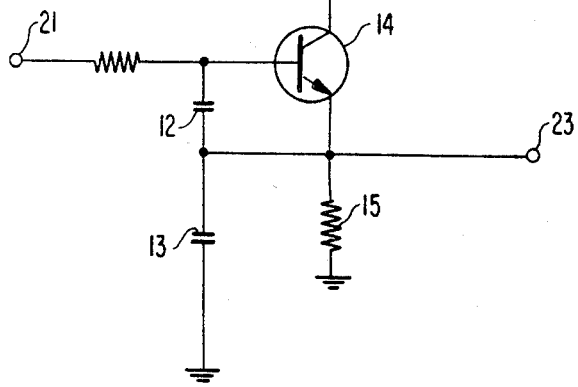
FIGS. 3, 4 and 5 are schematic circuit diagrams showing first, second and third preferred embodiments, respectively, of the present invention.

Referring now to FIG. 3, there is shown a first preferred embodiment of the present invention which comprises, a resistor 11 connected between an input terminal 21 and the base of a transistor 14, the emitter of the transistor 14 being grounded via a parallel circuit consisting of a capacitor 13 and a resistor 15, a capacitor 12 connected between the emitter and the base of the transistor 14, and an output terminal 23 connected to the emitter of the transistor 14. A terminal 24 is a power supply terminal which is connected to the collector of the transistor 14.

The capacitor 12 presents a sufficiently low impedance so as to derive no output from the horizontal synchronizing pulse in the composite synchronizing signal. Additionally the horizontal synchronizing pulse will not turn on the transistor 14.

For instance, it is selected at $0.047\mu F$.

During the horizontal synchronizing pulse period of the composite synchronizing signal applied to the terminal 21, the transistor 14 does not become conducting, so that there appears substantially no output at the output terminal 23. However, in response to the vertical synchronizing pulse which has a longer pulse duration than the horizontal synchronizing pulse, the capacitor 12 is charged thereby turning the transistor 14 conductive. The emitter current of the transistor 14 charges the capacitor 13, thus increasing the emitter voltage, i.e., the voltage of the output terminal 23 through one kind of positive feedback effect, and thereby a vertical synchronizing signal can be derived. The above-described circuit presents a very high input impedance and a low output impedance and it can operate quite satisfactorily. If the voltage across the capacitor 12 is lower than the base-emitter threshold voltage of the transistor 14, then the transistor will not become conducting, and therefore, a "shaking" of a picture image, that is, a jitter caused by the equalizing pulses can be prevented.

It is to be noted that in the above-mentioned embodiment, although the transistor 14 can be operated by a large composite signal enough to drive the transistor 14 into its saturated region, the aforementioned effect is especially remarkable when the transistor 14 is operated in its unsaturated region by a weak composite signal.

Figure 4:
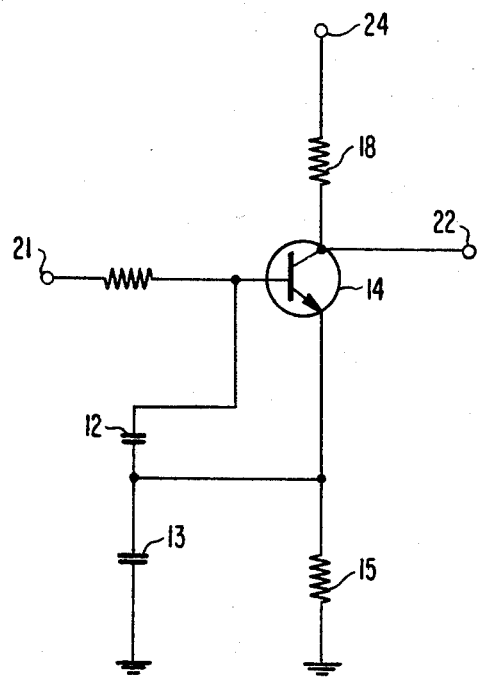

FIG. 4 shows a second preferred embodiment of the present invention, in which an output terminal 22 is connected to a collector of the transistor 14 and an output is derived from this terminal. In this embodiment, the collector of the transistor 14 is connected to a power supply terminal 24 through a resistor 18.

According to the above-described embodiment, although there are the disadvantages that the output impedance becomes higher than that in the case of the first embodiment and that the output signal is of opposite polarity to that of the input signal, the output signal is further amplified and the separation between the horizontal and vertical synchronizing signals is greater than in the case of the first embodiment. In addition, the fact that the polarities of the input and output signals can be freely selected as in the case of the first and second embodiments, enlarges the freedom in design of a vertical oscillator circuit to be connected to the separation circuit.

Figure 5:
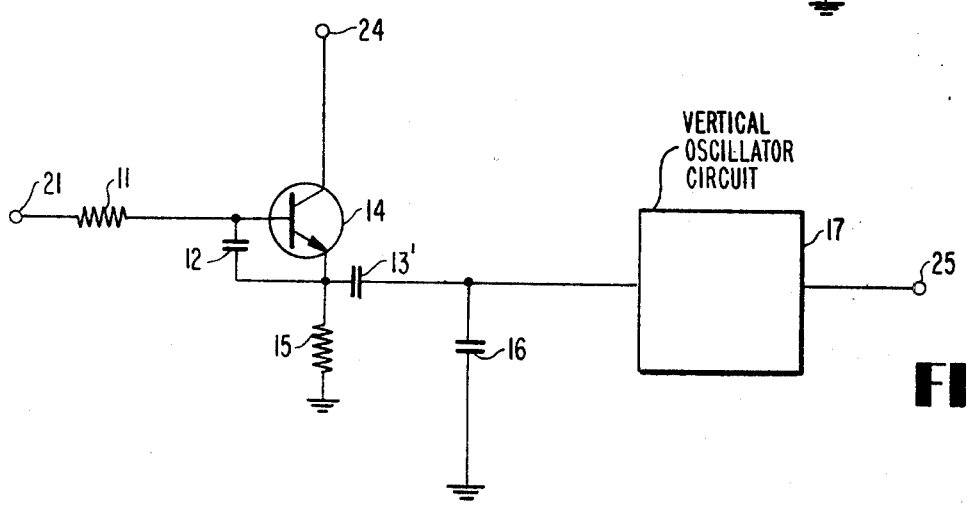

FIG. 5 shows a third embodiment of the present invention, in which a series circuit consisting of capacitors 13' and 16 is used in place of the capacitor 13 in the first embodiment, the junction point between the capacitors 13' and 16 being connected to a vertical oscillator circuit 17, and the oscillation output is obtained from an output terminal 25.

According to this embodiment, in addition to the advantages of the first embodiment, there exists an advantage that the self-exciting oscillation frequency of the vertical oscillator circuit 17 can be arbitrarily selected. For instance, the capacitor 16 is selected to have a value that determines the self-exciting oscillation frequency of the vertical oscillator circuit 17.

As described above, in any embodiment of the present invention, a transistor is used and thereby the efficiency of signal separation is greatly improved in comparison to the prior art circuit. Therefore, by further adding one or more stages of such integrating circuits to the preceding stage or to the output stage of the amplifier circuit, it is possible to further enhance the separation performance.

As explained in the preceding paragraphs, although the construction of every one of the synchronizing signal separation circuits embodying the present invention is very simple, they can separate the vertical synchronizing signal in an efficient manner, and thereby they can perfectly achieve the objects of the present invention. In addition, if provision is made so that the capacitors may be assembled as externally mounted parts, then every one of the integrating circuits can be easily designed in the form of an IC-circuit.

What is claimed is:
1. An integrating circuit comprising:
    a transistor having an emitter, a base and a collector
    a first resistor having its one terminal connected to the base of said transistor,
    an input terminal connected to the other terminal of said first resistor,
    a power supply terminal connected to the collector of said transistor,
    a fixed potential terminal connected to a constant potential,
    a first capacitor connected between the base and the emitter of said transistor,
    a second resistor connected between the emitter of said transistor and said fixed potential terminal,
    a second capacitor connected in parallel with said second resistor, and
    an output terminal coupled to the emitter of said transistor.
2. An integrating circuit claimed in claim 1, in which a composite synchronizing signal including a vertical and horizontal synchronizing pulse for a television receiver set is applied to said input terminal, and a verti- cal synchronizing signal is derived from said output terminal.

3. An integrating circuit comprising:
a transistor having an emitter, a base and a collector,
a first resistor having its one terminal connected to the base of said transistor,
an input terminal connected to the other terminal of said first resistor,
a power supply terminal connected to the collector of said transistor,
a fixed potential terminal connected to a constant potential,
a first capacitor connected between the base and the emitter of said transistor,
a second resistor connected between the emitter of said transistor and said fixed potential terminal,
a second and third capacitors connected in series between the emitter and said fixed potential terminal, and
an output terminal coupled to the junction point between said second and third capacitors.

4. An integrating circuit comprising:
a transistor having an emitter, a base and a collector,
a first resistor having its one terminal connected to the base of said transistor,
an input terminal connected to the other terminal of said first resistor,
a fixed potential terminal connected to a constant potential,
a first capacitor connected between the base and the emitter of said transistor,
a second resistor and a second capacitor connected in parallel with each other between the emitter of said transistor and said fixed potential terminal,
a third resistor having its one terminal connected to the collector of said transistor,
a power supply terminal connected to the other terminal of said third resistor, and
an output terminal electrically coupled to the collector of said transistor.

* * * * *